United States Patent
Lo

(10) Patent No.: US 9,048,905 B2
(45) Date of Patent: *Jun. 2, 2015

(54) METHOD AND SYSTEM FOR RF TRANSMITTING AND RECEIVING BEAMFORMING WITH LOCATION OR GPS GUIDANCE

(75) Inventor: Chung-Wen (Dennis) Lo, Palo Alto, CA (US)

(73) Assignee: MEDIATEK INC., Hsin-Chu (TW)

( * ) Notice: Subject to any disclaimer, the term of this patent is extended or adjusted under 35 U.S.C. 154(b) by 430 days.

This patent is subject to a terminal disclaimer.

(21) Appl. No.: 12/372,320

(22) Filed: Feb. 17, 2009

(65) Prior Publication Data
US 2010/0124212 A1   May 20, 2010

Related U.S. Application Data

(63) Continuation-in-part of application No. 12/271,799, filed on Nov. 14, 2008.

(51) Int. Cl.
*H04W 4/00* (2009.01)
*H04B 7/06* (2006.01)
*H04W 48/08* (2009.01)

(52) U.S. Cl.
CPC ............. *H04B 7/0617* (2013.01); *H04W 48/08* (2013.01)

(58) Field of Classification Search
CPC ................................. H04B 7/06; H04W 48/08
USPC ...................... 370/332, 338; 455/456, 67, 432
See application file for complete search history.

(56) References Cited

U.S. PATENT DOCUMENTS

| | | | |
|---|---|---|---|
| 5,363,376 A * | 11/1994 | Chuang et al. | 370/332 |
| 6,370,182 B2 * | 4/2002 | Bierly et al. | 375/140 |
| 6,459,884 B1 * | 10/2002 | Amezawa | 455/67.16 |
| 6,512,481 B1 * | 1/2003 | Velazquez et al. | 342/367 |
| 6,658,234 B1 | 12/2003 | Dogan et al. | |
| 6,888,811 B2 * | 5/2005 | Eaton et al. | 370/338 |
| 7,072,669 B1 * | 7/2006 | Duckworth | 455/456.1 |
| 7,286,844 B1 * | 10/2007 | Redi et al. | 455/522 |
| 7,324,782 B1 * | 1/2008 | Rudrapatna | 455/25 |
| 7,706,810 B1 * | 4/2010 | Mitchell | 455/456.1 |
| 7,746,943 B2 | 6/2010 | Yamaura | |

(Continued)

FOREIGN PATENT DOCUMENTS

CN    101159474 A       4/2008
EP    1562257 A1 *     8/2005

OTHER PUBLICATIONS

Wikipedia—http://en.wikipedia.org/wiki/wireless_access_point.
(Continued)

*Primary Examiner* — Steven H Nguyen
(74) *Attorney, Agent, or Firm* — Sawyer Law Group, P.C.

(57) ABSTRACT

A method and system for radio frequency transmitting and receiving beamforming using both GPS guidance and wireless access points is disclosed. The method and system comprises providing a wireless networking device with a locating system; providing an access point, the access point broadcasting its location; calculating a relative vector from the device to the access point based upon the location; steering a transmitted beam with a sounding packet to the access point; calculating a channel condition by the access point; and sending a packet by the access point to the wireless networking device to establish a connection.

11 Claims, 8 Drawing Sheets

(56) References Cited

U.S. PATENT DOCUMENTS

| | | | |
|---|---|---|---|
| 7,804,800 B2 | 9/2010 | Li et al. | |
| 7,813,326 B1 * | 10/2010 | Kelm et al. | 370/338 |
| 7,899,472 B1 | 3/2011 | Wang | |
| 8,041,333 B2 * | 10/2011 | Hansen et al. | 455/404.2 |
| 8,107,964 B2 | 1/2012 | Nylander et al. | |
| 2001/0003443 A1 * | 6/2001 | Velazquez et al. | 342/367 |
| 2001/0022557 A1 * | 9/2001 | Rouphael et al. | 342/367 |
| 2001/0031648 A1 * | 10/2001 | Proctor et al. | 455/562 |
| 2002/0147032 A1 | 10/2002 | Yoon et al. | |
| 2003/0048760 A1 | 3/2003 | Park et al. | |
| 2003/0114195 A1 * | 6/2003 | Chitrapu et al. | 455/562 |
| 2003/0161384 A1 | 8/2003 | Chun et al. | |
| 2004/0266457 A1 * | 12/2004 | Dupray | 455/456.5 |
| 2005/0014533 A1 * | 1/2005 | Cave et al. | 455/562.1 |
| 2005/0048921 A1 | 3/2005 | Chung | |
| 2005/0181799 A1 | 8/2005 | Laroia et al. | |
| 2005/0288034 A1 | 12/2005 | Judson et al. | |
| 2006/0111149 A1 | 5/2006 | Chitrapu et al. | |
| 2007/0025293 A1 | 2/2007 | Choi | |
| 2007/0121557 A1 * | 5/2007 | Sylvain | 370/338 |
| 2007/0142074 A1 * | 6/2007 | Black et al. | 455/522 |
| 2007/0206504 A1 | 9/2007 | Koo et al. | |
| 2007/0286303 A1 | 12/2007 | Yamaura | |
| 2008/0014870 A1 | 1/2008 | Kim | |
| 2008/0045153 A1 | 2/2008 | Surineni et al. | |
| 2008/0130597 A1 | 6/2008 | Kalhan | |
| 2008/0146232 A1 * | 6/2008 | Knisely | 455/437 |
| 2008/0212538 A1 | 9/2008 | Molisch | |
| 2009/0003279 A1 * | 1/2009 | Abusch-Magder et al. | 370/331 |
| 2009/0042557 A1 | 2/2009 | Vardi et al. | |
| 2009/0227254 A1 * | 9/2009 | Hwang | 455/432.2 |
| 2010/0124210 A1 * | 5/2010 | Lo | 370/338 |

OTHER PUBLICATIONS

Wikipedia—http://en.wikipedia.org/wiki/beamforming.

* cited by examiner

METHOD AND SYSTEM FOR RF TRANSMITTING AND RECEIVING BEAMFORMING WITH LOCATION OR GPS GUIDANCE

CROSS-REFERENCE TO RELATED APPLICATIONS

This application claims the benefit of priority of and is a Continuation-in-Part of co-pending U.S. patent application Ser. No. 12/271,799, entitled "METHOD AND SYSTEM FOR RF TRANSMITTING AND RECEIVING BEAMFORMING WITH GPS GUIDANCE," filed on Nov. 14, 2008, which is incorporated herein by reference.

FIELD OF THE INVENTION

The present invention relates generally to wireless systems and more specifically to wireless systems with beamforming capability.

BACKGROUND OF THE INVENTION

In computer networking, a wireless access point or a base station is a device that allows wireless communication devices to connect to a wireless network such as wireless local area network (WLAN) or wireless metropolitan area network (WMAN) or other related standards. The access point or base station usually connects to a wired network, and can relay data between the wireless devices (such as computers or printers) and wired devices on the network (Wikipedia—http://en.wikipedia.org/wiki/Wireless_access_point).

Location devices such as a global positioning system (GPS) have been widely used in portable devices such as cellular phones, MP3 players and in automobiles. Today, WLAN devices are often embedded in these and countless other portable devices.

Beamforming is a signal processing technique used in sensor arrays for directional signal transmission or reception. (http://en.wikipedia.org/wiki/Beamforming) In wireless devices, beamforming utilizing multiple antenna or multiple transceivers has been used as one means to increase signal strength and hence range in one or several desired directions. Historically, many methods have been utilized to perform beamforming in order to establish an initial connection. One traditional technique involves the use of DSP Processors and FPGA chips to search in various patterns. However, this technique is known to incur high development costs.

Another common approach to beamforming requires the use of a conventional isotropic signal in order to establish the initial connection and then perform the beamforming to increase signal to noise ratio. Under this method, as the range increases, the signal to noise ratio begins to decline which directly results in decreased performance. Hence, performance using the conventional isotropic signal is limited by the isotropic range.

A third approach to beamforming involves the use of multiple antennas and multiple transceivers as a way of increasing signal strength, and hence, the signal range. However, since the location of the link to be formed is unknown, there are often failed connections since the link location is too far away and not reachable. Therefore, this method proves to be both time-consuming and inefficient since the non-guided beams are either received in the wrong places, or not received at all.

Accordingly, what is needed is a method of transmitting and receiving beamforming that overcomes the above-described operational issues. The method should be cost-effective, easily implemented, efficient, and have good performance characteristics. The present invention addresses such a need.

SUMMARY OF THE INVENTION

The present invention satisfies this need, and presents a method and system for radio frequency transmitting and receiving beamforming using preloaded locations of wireless access points. To achieve the above object, the present method and system are described as: providing a wireless networking device with a locating device such as a global positioning system; providing an access point, the access point broadcasting its location; calculating a relative vector from the device to the access point based upon the location; steering a transmitted beam with a sounding packet to the access point; calculating a channel condition by the access point; and sending a packet by the access point to the wireless networking device to establish a connection. One advantage of a system and method in accordance with the present invention is that the beamforming is transmitted with known direction by the calculated relative vector. This allows for a more efficient connection because with conventional methods the transmitted signal would either not be received at all, or would be received as a weak signal resulting in low throughput. A second advantage of a system and method in accordance with the present invention is the fact that both the range and signal throughput are increased since the location of the access point is predetermined.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION

The present invention relates generally to wireless systems and more specifically to wireless systems with beamforming capability. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention uses a wireless networking device with preloaded wireless access point locations and calculates a relative vector to an access point based on at least one of the preloaded wireless access point locations. A transmitting beam and a sounding packet are steered toward the access point and finally, a packet is sent by the access point to the wireless networking device to establish the desired connection. The method and system in accordance with the present invention has many advantages which are described herein below.

A method and system that utilizes a wireless networking device with preloaded wireless access points in accordance with the present invention can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, the method and system that utilizes a wireless networking device with preloaded wireless access points can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present invention in more detail, refer now to the following description in conjunction with the accompanying Figures.

Figure 1A:
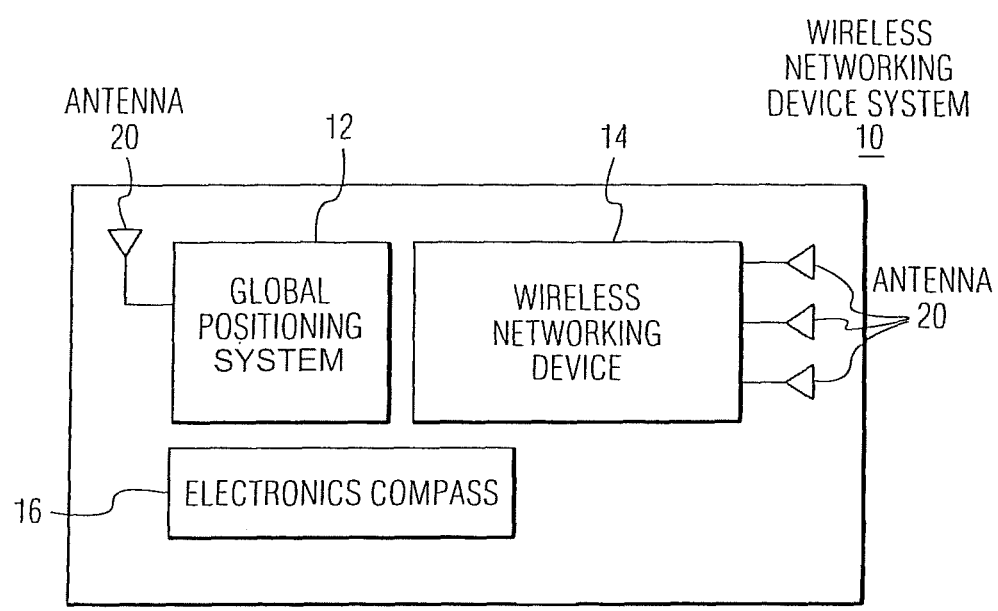
FIG. 1a illustrates a wireless networking device system.
Figure 1B:
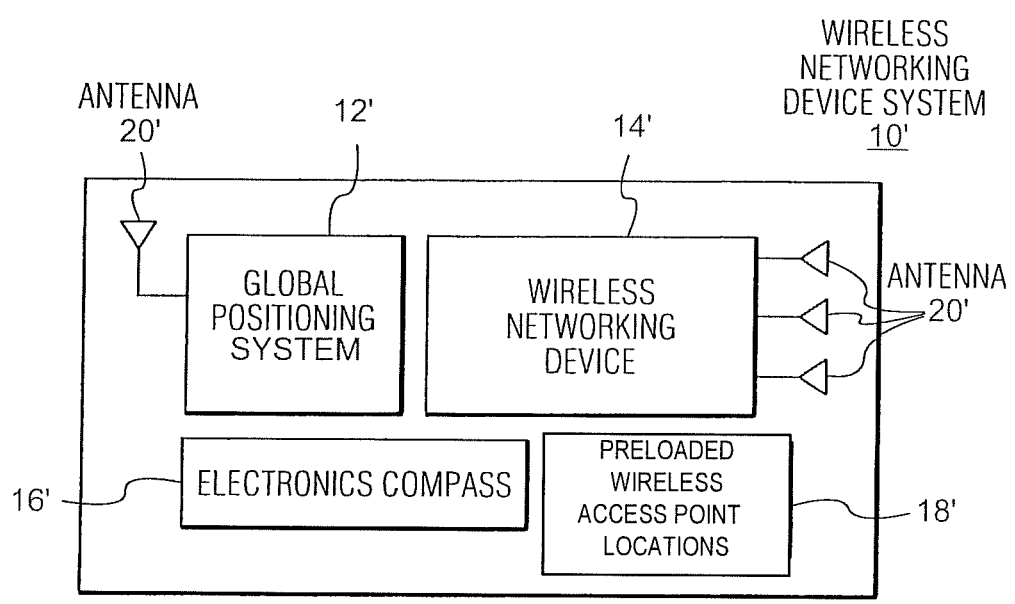
FIG. 1b is an illustration of the communication that occurs between the wireless networking device system and the access point.

FIG. 1a illustrates a wireless networking device system 10 in accordance with an embodiment. The system 10 includes a wireless networking device 14, a locating device such as a global positioning system (GPS) 12, and an electronic compass 16. In this type of system, there are several ways to obtain the location of wireless access points. In a first system as shown in FIG. 1b, the system 10' includes preloaded wireless access point locations 18'. Preloaded wireless access point locations indicate where access points are located in relationship to the area.

Figure 1C:
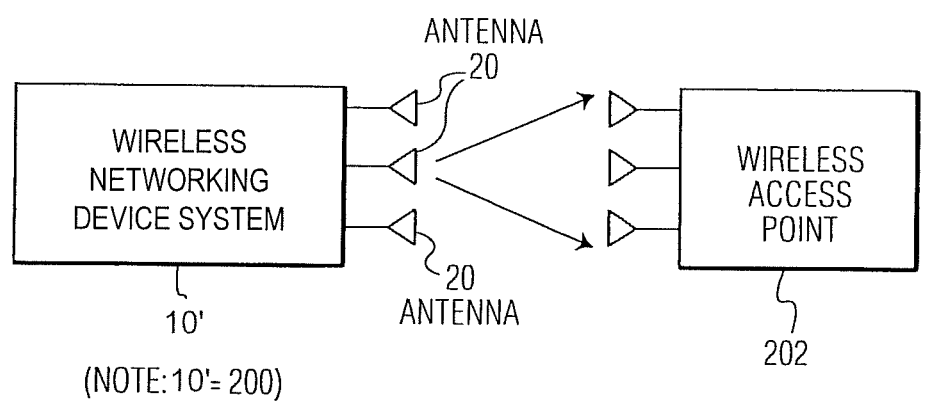
FIG. 1c illustrates the communication that occurs between the wireless networking device system and an access point in the system of FIG. 1b.

FIG. 1c illustrates the communication that occurs between the wireless networking device system of FIG. 1b and an access point 202. The preloaded wireless access point locations 18' correspond to the access points 202 in a particular area. In one embodiment, the wireless networking device system 14' would have stored the location of these access points 202 in a particular memory format such as random access memory, read-only memory, or the like.

For example, if an automobile traveling in San Francisco were equipped with such a wireless networking device system 10', the wireless networking device 14' within the automobile would have the locations of the particular wireless access points according to the preloaded wireless access point locations 18' throughout San Francisco stored within its memory. One such location of a wireless access point according to the preloaded wireless access point locations 18' may be Coit Tower, for example. The wireless networking device system 10' within the automobile would communicate with the wireless access point according to the preloaded wireless access point locations 18' to identify the access point 202 that corresponds to Coit Tower. Next, the wireless networking device system 10' would determine if the access point 202 within Coit Tower was available (i.e. the channel is clear) and able to accommodate such a connection.

Figure 2:
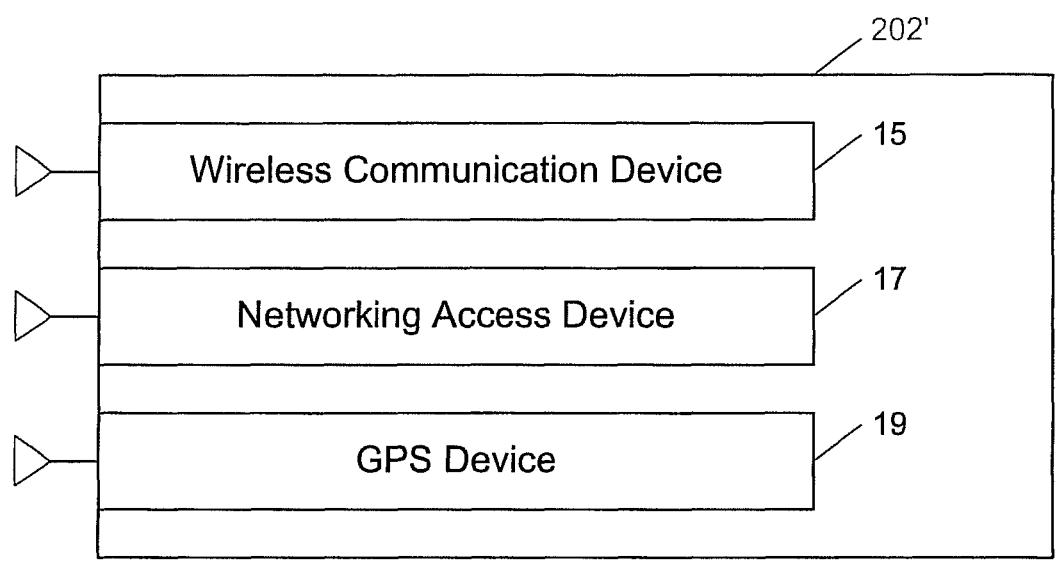
FIG. 2 is a diagram of a wireless access point which broadcasts its location.

In another system, a wireless access point with a known location broadcasts its location information through wired or wireless networking to other devices. FIG. 2 is a diagram of a wireless access point 202' which broadcasts its location. The wireless access point 202' includes a wireless communication device 15, a networking access device 17 and a locating device such as a GPS device 19. Through the GPS device 19, the wireless access point 202' obtains its physical location and broadcasts its location to the wireless network system, such as the wireless network system 10' in FIG. 1c. The deployed wireless access point physical location can be collected through the network or other methods for other applications.

Figure 3:
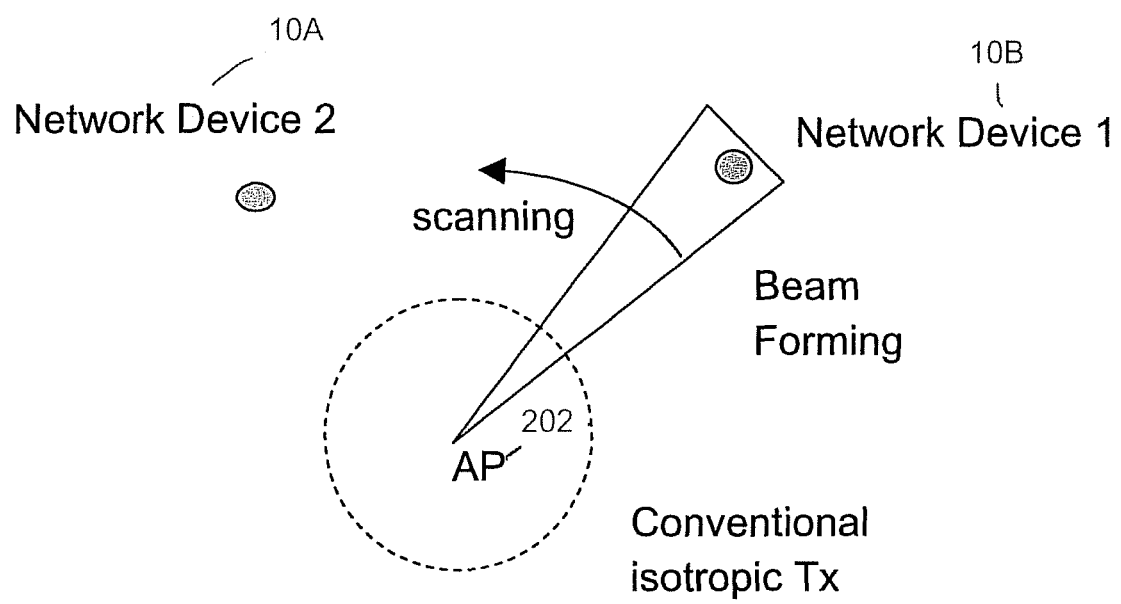
FIG. 3 shows a wireless access point broadcasting its location through wireless networking to wireless network devices.

As shown in FIG. 3, when a wireless access point broadcasts its location through wireless networking to wireless network devices 10a and 10b, it can transmit the information with a beamforming technique. The access point scans all or possible directions to reach a wider coverage for the devices 10a and 10b to provide the access point location and channel information.

Figure 4:
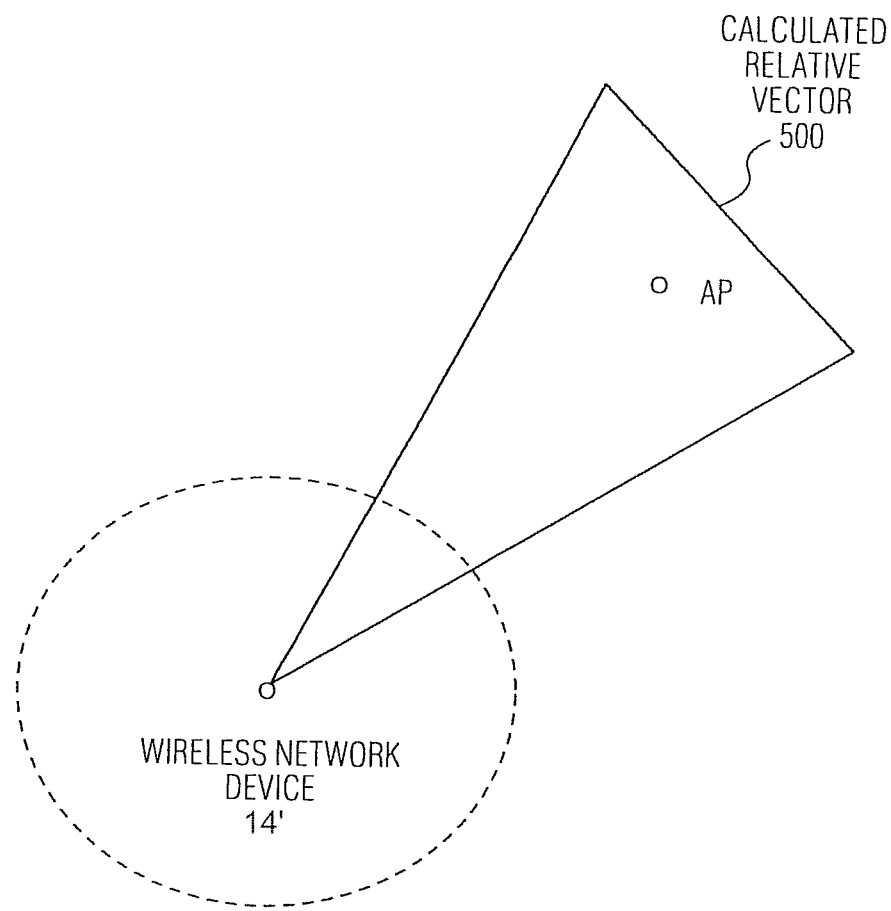
FIG. 4 is an illustration of the calculated relative vector to the access point as determined by the wireless networking device.

FIG. 4 is an illustration of a calculated relative vector 500 to an access point as determined by the wireless networking device 14'. This vector can be calculated utilizing the preloaded wireless access point locations in the network device or by providing a wireless access point that broadcasts its locations.

Figure 5:
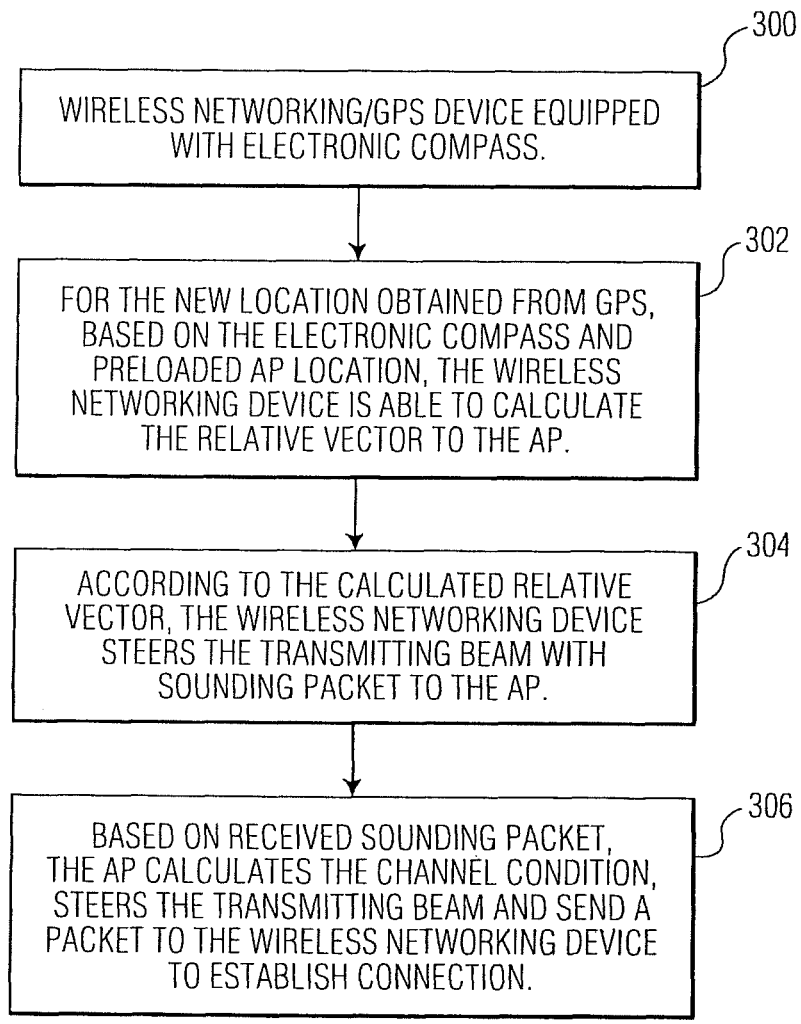
FIG. 5 is a flowchart that describes the negotiation process between the wireless networking device and an access point to establish a connection.

FIG. 5 is a flowchart that describes the negotiation process between the wireless networking device 14' and the access point to establish a connection. First, the wireless networking device 14' communicates with an electronic compass 16, the GPS 12, to ascertain the location of a wireless access point, via step 300. Next, referring to FIGS. 4 and 5 together, the access point location is determined as the wireless networking device 14' calculates a relative vector to the access point AP, via step 302. In step 304, according to the calculated relative vector to the access point AP, the wireless networking device 14' steers the transmitting beam and a sounding packet to the access point.

The sounding packet may include multiple frames including Legacy Short Training Frames (L-STF), Legacy Long Training Frames (L-LTF), Legacy Signaling Frames (L-SIG), High-Throughput Long Training Frames (HT-LTF), and data (HT-DATA). The Legacy frames refer to frames according to previous versions of the IEEE 802.11 standard. The High-Throughput refers to frames according to draft IEEE 802.11n standard specifications currently being developed and regarding which a draft document titled "PHY subsection Tech Spec 889r7" including a recent version of the specifications is incorporated herein by reference, and within which certain features of the present invention would preferably be incorporated. Such sounding packets are described, for example in patent application no. US2008/0212538 A1, entitled "Antenna Selection for Multi-Input Multi-Output System".

Finally, based on the received sounding packet, the access point calculates the channel condition, steers the transmitting beam, and sends a packet (not shown) to the wireless networking device 14' to establish the connection, via step 306.

Figure 6:
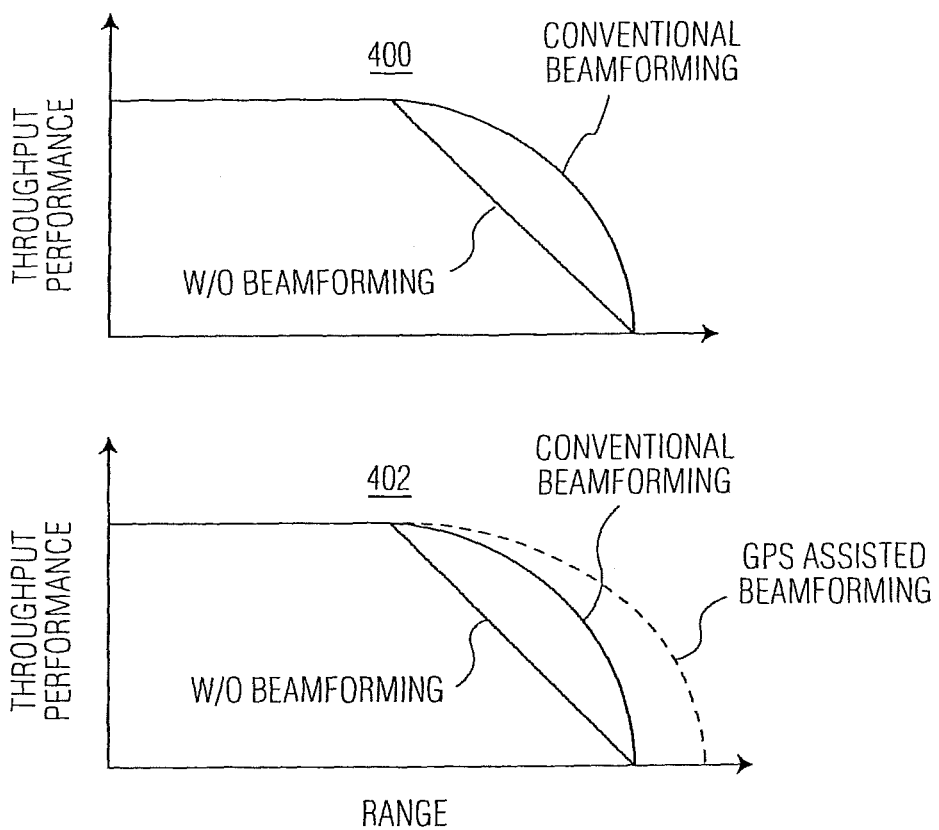
FIG. 6 illustrates the range of both conventional and location (GPS)-assisted beamforming techniques.

FIG. 6 illustrates the performance characteristics of both a conventional and a beamforming technique in accordance with the present invention. The first waveform 400 shows that conventional beamforming techniques may enhance the signal to noise ratio (SNR) which thereby increases only the throughput performance. However, there is no impact to the range since the range is limited by the initial packet detection.

By contrast, the second waveform 402 shows that the beamforming technique poses a significant advantage over the conventional beamforming technique. The advantage is due to the range of the wireless device which is increased due to both the calculated relative vector to the access point and the known direction of the transmitted beam based on the preloaded wireless access point location. Thus, the beamforming technique of the present invention allows both the SNR and the range to be enhanced substantially.

Although the present invention has been described in accordance with the embodiments shown, one of ordinary skill in the art will readily recognize that there could be variations to the embodiments and those variations would be within the spirit and scope of the present invention.

Accordingly, many modifications may be made by one of ordinary skill in the art without departing from the spirit and scope of the appended claims.

What is claimed is:

1. A method for establishing a wireless connection between a wireless networking device and an access point, comprising:
   scanning, by the access point, possible directions to transmit an access point location to the wireless networking device using beamforming;
   calculating, by the wireless networking device, a relative vector from the wireless networking device to the access point based upon a beam from the beamforming received by the wireless networking device or based upon at least one of a plurality of preloaded access point locations, wherein the calculated relative vector is a triangular area from the wireless networking device to an area that encompasses the access point;
   steering, by the wireless networking device, a transmitted beam to the access point based upon the calculated relative vector;
   determining, by the access point, a channel condition based upon the received transmitted beam; and
   wherein if the channel condition is acceptable, sending, by the access point, a packet to the wireless networking device to establish the wireless connection.

2. The method of claim 1 further including:
   providing the wireless networking device with a locating device that comprises a global positioning system (GPS) and an electronic compass.

3. The method of claim 2 further including:
   calculating the relative vector utilizing the compass and the GPS to establish the wireless networking device location.

4. The method of claim 1 wherein steering the transmitting beam comprises initiating a searching algorithm based on the calculated relative vector.

5. A non-transitory computer readable medium containing programming instructions for establishing a wireless connection between a wireless networking device and an access point, the instructions being executable for:
   scanning, by the access point, possible directions to transmit an access point location to the wireless networking device using beamforming;
   calculating, by the wireless networking device, a relative vector from the wireless networking device to the access point based upon a beam from the beamforming received by the wireless networking device or based upon at least one of a plurality of preloaded access point locations, wherein the calculated relative vector is a triangular area from the wireless networking device to an area that encompasses the access point;
   steering, by the wireless networking device, a transmitted beam to the access point based upon the calculated relative vector;
   determining, by the access point, a channel condition based upon the received transmitted beam; and
   wherein if the channel condition is acceptable, sending, by the access point, a packet to the wireless networking device to establish the wireless connection.

6. The non-transitory computer readable medium of claim 5 wherein the wireless networking device includes a locating device that comprises a global positioning system (GPS) and an electronic compass.

7. The non-transitory computer readable medium of claim 5 further including the instructions for:
   initiating a searching algorithm based on the calculated relative vector.

8. An access point comprising:
   a locating device;
   a communication device coupled to the locating device, wherein location information via the locating device is broadcast to a plurality of wireless networking devices; and
   a networking access device coupled to the communication device, wherein the networking access device scans possible directions to transmit an access point location to at least one of the plurality of wireless networking devices using beamforming and establishes a wireless connection between the access point and the at least one of the plurality of wireless networking devices using a transmitted beam steered to the access point based upon a calculated relative vector and an acceptable channel condition determined using the transmitted beam, wherein the calculated relative vector is calculated by the at least one of the plurality of wireless networking devices based upon a beam from the beamforming or at least one of a plurality of preloaded access point locations, wherein the calculated relative vector is a triangular area from the wireless networking device to an area that encompasses the access point.

9. The access point of claim 8 wherein upon receiving the information regarding each new access point, the wireless networking device calculates a relative vector to the access point; wherein based on the relative vector to the access point, the wireless networking device steers a transmitting beam and a sounding packet to the access point; wherein the access point sends a packet to the wireless networking device and a connection is thereby established.

10. The access point of claim 8 wherein the locating device comprises a global positioning system (GPS) and an electronic compass.

11. The access point of claim 8 wherein the access point scans possible directions to reach a wider coverage for the plurality of wireless networking devices to provide the access point location and channel information.

* * * * *